United States Patent
Rogers

[15] 3,656,163
[45] Apr. 11, 1972

[54] ANTENNA TENSIONING UNIT
[72] Inventor: William C. Rogers, 5363 N.W. 36th Street, Miami Springs, Fla. 33166
[22] Filed: Jan. 6, 1970
[21] Appl. No.: 952

[52] U.S. Cl. ................................343/705, 343/877, 174/40 TD
[51] Int. Cl. ..............................................H01q 1/28
[58] Field of Search................242/107 R, 107.5; 185/37, 45; 174/40.2, 40 TD, 45 TD; 343/705, 708, 877

[56] References Cited

UNITED STATES PATENTS

| 1,895,493 | 1/1933 | Sherman | 343/877 |
| 2,121,478 | 6/1938 | Dorman | 174/40 |
| 2,790,023 | 4/1957 | Keller | 343/705 |
| 3,003,357 | 10/1961 | Votta | 242/107 |
| 3,012,736 | 12/1961 | Brust | 242/107.5 |
| 3,156,431 | 11/1964 | Zivi | 242/107 |
| 3,493,191 | 2/1970 | Hughes | 242/107 |

FOREIGN PATENTS OR APPLICATIONS

| 1,538,546 | 7/1968 | France | 174/40.2 |

Primary Examiner—Eli Lieberman
Attorney—Burns, Doane, Swecker & Mathis

[57] ABSTRACT

An aircraft antenna tensioning unit shaped to reduce aerodynamic drag and corona discharge in which the tensional force may be selected after installation of the device on an aircraft without resort to special tools.

18 Claims, 7 Drawing Figures

PATENTED APR 11 1972

INVENTOR
WILLIAM C. ROGERS

BY Burns, Doane, Benedict,
Swecker & Mathis
ATTORNEYS

PATENTED APR 11 1972  3,656,163

INVENTOR
WILLIAM C. ROGERS

BY Burns, Doane, Benedict,
Swecker & Mathis
ATTORNEYS

ANTENNA TENSIONING UNIT

BACKGROUND OF THE INVENTION

The present invention relates to an aircraft antenna tensioning device and more specifically to a novel device for selectively varying the tensional force under which an antenna externally mounted on an aircraft may be maintained.

External wire antennas have many applications today on both light and heavy aircraft and are utilized both to receive and transmit radiowave energy. The length of the antenna is, of course, a function of the wavelength of the radiowave energy desired to be transmitted or received. Antenna length, and therefore antenna weight, may vary greatly since the desired wavelength may vary over a wide range with the type of aircraft, i.e., military, commercial or private. Antenna weight may also vary from aircraft to aircraft based on the performance characteristics thereof in that additional strength may be needed to resist the mechanical forces to which the antenna may be subjected.

In addition, there is a great variance between the external antenna configurations of various types of aircraft, and the mechanical stress to which the antenna may be subjected varies not only with the distance between available antenna supports on the aircraft, but may vary significantly with the position relative to the aircraft axis due to wind resistance.

For these and other reasons, it is necessary that the tensional force applied to the antenna systems of various aircraft vary to prevent the sagging or erratic movement thereof during flight. It is, accordingly, an object of the present invention to provide a novel, single antenna tensioning device adaptable for use with a variety of aircraft and a host of antenna configurations and frequency bands.

It is another object of the present invention to provide a novel antenna tensioning device in which the tensional force applied to the antenna may be selectively varied after installation of the device.

It is still another object of the present invention to provide a novel antenna tensioning device which compensates for slight increases in the length of the antenna due to the stretching thereof.

It is a further object of the present invention to provide a novel constant tension antenna tensioning device yieldable to sudden mechanical forces without damage to the antenna or to the aircraft.

It is still a further object of the present invention to provide a novel antenna tensioning device having a compact construction which minimizes aerodynamic drag and the possibility of disruptive corona discharge.

It is yet a further object of the present invention to provide a novel antenna tensioning device having redundant tension imparting means as a safeguard against mechanical failure, which tensioning means may be easily and quickly replaced without the need for special tools.

These and other objects and advantages of the present invention will be apparent to one skilled in the art to which the invention pertains from a perusal of the claims and the following detailed description of a preferred embodiment when read in conjunction with the appended drawings.

THE DRAWINGS

DETAILED DESCRIPTION OF THE DRAWINGS

Figure 1:
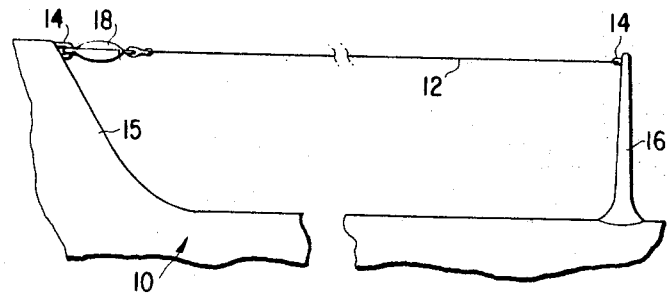
FIG. 1 is a partial elevation of the antenna tensioning device of the present invention installed on an aircraft.
Figure 2:
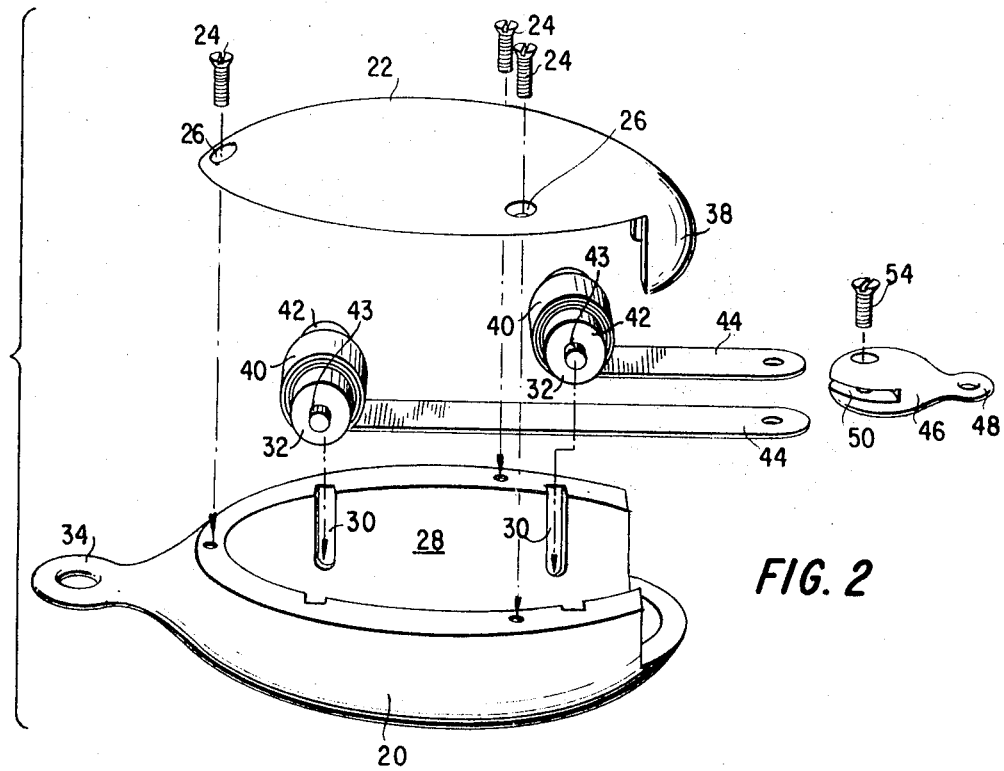
FIG. 2 is an exploded view of the antenna tensioning device of FIG. 1.
Figure 3:
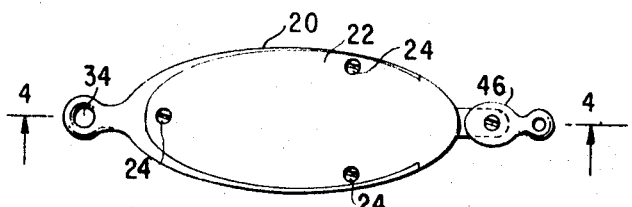
FIG. 3 is a top plan view of the aircarft antenna tensioning device of FIG. 1.

Referring now to the drawings, and specifically to FIG. 1, portions of an aircraft 10 are illustrated as having an antenna 12 connected between a pair of conventional mounting brackets 14 attached respectively to the vertical stabilizer 15 and an antenna feed-through mast 16. The antenna 12 may be any conventional antenna having a predetermined length related to the frequency band of the radiowave energy to be transmitted and received. The antenna 12 may be lectrically isolated from the metallix skin of the aircraft 10 by an insulator (not shown) intermediate the brackets 14 on the vertical stabilizer 15 and the antenna tensioning device 18. Alternatively, the housing of the antenna tensioning device 18 may be constructed of an insulative material eliminating the necessity for the additional insulator.

Referring now to FIGS. 2-5 where a preferred embodiment of the antenna tensioning device of the present invention is illustrated, the antenna tensioning device includes a housing 20 which is smooth and aerodynamically shaped for minimum resistance to air flow during flight and cornerless to minimize the possibility of communications disruptive corona discharge. The housing 20 may be provided with an access cover 22 secured to the housing 20 in a conventional manner as, for example, by a plurality of screws 24 countersunk into apertures 26 in the cover 22.

A cavity 28, defined by the housing 20, may be provided with a pair of slots 30 in each of the vertical sidewalls thereof to facilitate the insertion and removal of tensioning units 32. These slots 30 may be inclined slightly forward so that the tensioning units 32, under tension, will be urged to the bottom of the slots.

The housing may be additionally provided with a suitable and conventional means for providing a reliable connection between the housing 20 and one of the aircraft antenna mounting brackets 14. As illustrated, the connector means 34 may be an eye-bolt integral with the housing 20 and faired smoothly therefrom. At a point directly opposite the mounting means 34, an aperture 36 may be provided through the housing 20. This aperture 36 is preferably formed at the intersection of the housing 20 and the depending flap 38 of the access cover 22 to further facilitate the insertion and removal of the tensioning units 32.

Figure 4:
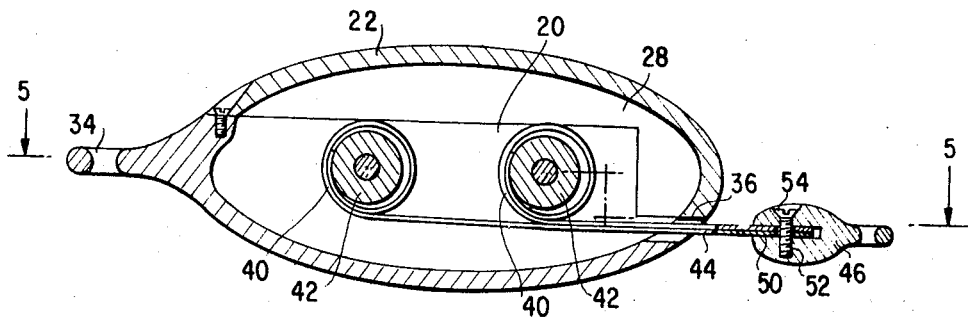
FIG. 4 is a section and elevation taken through lines 4—4 of FIG. 3 with the tensioning members installed.
Figure 5:
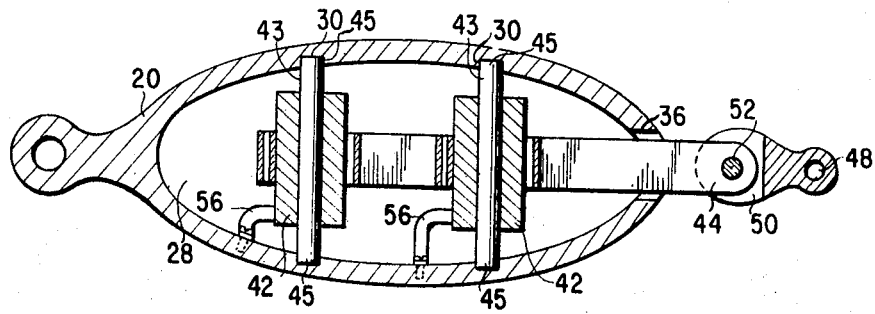
FIG. 5 is a section in planned view taken through lines 5—5 of FIG. 4.

The tensioning units 32 may be conventional in construction and may comprise, as illustrated in FIGS. 4 and 5, a tensioning member 40 such as a flat spring tightly coiled about a drum or reel 42 mounted in a conventional manner on a coaxial shaft 43. The drums 42 may be mounted for axial rotation within the housing 20 on the shafts 43 by disposing the ends 45 of the shafts 43 in the slots 30 as illustrated. The outermost or free ends 44 of the springs 40 extend in an overlying relationship through the aperture 36 between the housing 20 and the cover 22 for attachment in a conventional manner to a connector means 46, e.g., a conventional eyebolt exteriorly of the housing 20. Conventional stop means (not shown) may be provided to prevent the complete withdrawal of the free ends 44 of the tensioning member 40 into the housing 20. Thus, the housing 20 need not be disassembled for the selective connection of the tensioning members 40 to the antenna 12. It is, however, desirable that the extent of the protrusion of the free ends 44 through the aperture 36 be limited for corona discharge and wind reaction considerations.

While in a preferred embodiment of the present invention the outermost or free ends 44 of the springs 40 may extend through the aperture 36, each of the springs may be provided at its outer extremity with an elongated flexible member, e.g., a nylon tape, connected interiorly of the housing 20 to free ends 44 of the springs 40 in a suitable conventional manner. The tensioning device 18 may thus be electrically isolated from the antenna without inserting a separate insulator.

The connector means 46 may comprise a solid member having an eye 48 at one end thereof to facilitate connection thereof to the antenna 12, and a slot 50 on the other end thereof adapted to receive the free ends 44 of the springs 40 extending through the aperture 36 of the housing 20. A blind, tapped aperture 52 extending through the parallel horizontal surfaces of the slot 50 may be provided to receive a screw 54 or other conventional fastening means.

As illustrated in FIG. 5, an electrically conductive wiper arm 56 may be secured to the internal wall of the housing 20 in a conventional manner to extend therefrom into contact with each of the springs 40 or the drums 42 of the tensioning units 32. A discharge path may thereby be provided for any static electricity which may tend to accumulate on the tensioning units 32. The wiper arms must, of course, be grounded to the skin of the aircraft. These wiper arms may also be used where the antenna tensioning device is installed between the antenna and the radio equipment to provide a conductive path between the equipment and the antenna.

Figure 6:
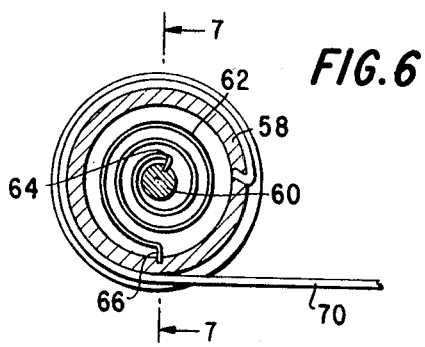
FIG. 6 is a pictorial view in partial section of a second embodiment of the tension member of FIG. 1.
Figure 7:
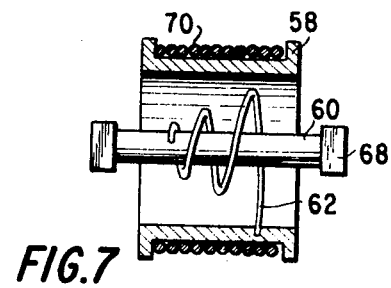
FIG. 7 is a pictorial view in partial section of the embodiment of the tension member of FIG. 6.

While the tensioning members of each tensioning unit 32 are preferably flat, spiral-wound, constant tension springs, as previously described, other forms of tensioning members may be utilized. For example, and as illustrated in FIG. 6, the tensioning unit may include a drum or reel 58 journaled for rotation about the shaft 60 and a spiral-wound spring 62 attached at one end 64 to the shaft 60 and at the other end 66 to the interior surface of the reel 58 to bias the reel 58 to a predetermined angular position relative to the shaft 60. The shaft 60 may be secured against rotation in a conventional manner, for example, by providing rectangularly shaped ends 68 on the shaft, as illustrated in FIG. 7, to prevent the rotation thereof when disposed in the slots 30 of the housing 20. A web member 70, such as a nylon tape or cable, may be secured to and wound around the reel with the free end thereof extending through the aperture 36 of the housing 20, as previously described.

In utilizing the antenna tensioning device of the present invention, the access cover is removed and the shafts 43 of the tensioning units 32 are inserted in the slots 30 in the internal side walls of the housing 20, with the free ends 44 of the springs 40 extending through the front thereof. The free ends 44 of the springs 40 may be placed in the slot 50 of the connector means 46 and the screw 54 threaded into place. The access cover 22 may then be replaced.

When employing two tensioning units having springs 40 of different tensional characteristics, the tension may be selectively varied to comprise the tensional force of one spring, the tensional force of the second spring, or the combined tensional force of both springs merely by the selective connection of the connecting means 46.

Further, since the tensioning units 32 may be easily removed and replaced in the housing 20, the tensional characteristics of the tensioing device 18 may easily be modified by the utilization of various combinations of tensioning units.

Although the invention has been described with reference to a preferred embodiment and alternatives thereof, it will be appreciated by those skilled in the art that modifications, additions, substitutions, deletions and other changes not specifically described may be made within the spirit of the invention. The invention is, therefore, to be limited solely by the language of the following claims when accorded a full range of equivalents.

What is claimed is:

1. Apparatus comprising:
   an aircraft;
   first mounting means connected at a first predetermined location on the exterior of said aircraft;
   an elongated antenna having one end connected to said first mounting means;
   second mounting means connected at a second predetermined location on the exterior of said aircraft;
   a smooth, aerodynamically shaped housing having a central cavity and an aperture at one end thereof, said housing being secured to said second mounting means at the other end thereof;
   a plurality of tensioning units mounted in said cavity, each of said tensioning units having an elongated member includes a nonrotatable shaft, a drum mounted for rotation about said shaft, a spiral wound spring having one end connected to said shaft and the other end connected to the interior of said drum for biasing said drum to a predetermined angular position relative to said shaft, and a flexible web wound about said drum with one end of said web extending through said aperture; and,
   means for selectively connecting the elongated member of said tensioning units to the other end of said antenna.

2. Apparatus comprising:
   an aircraft;
   first mounting means connected at a first predetermined location on the exterior of said aircraft;
   an elongated antenna having one end connected to said first mounting means;
   second mounting means connected at a second predetermined location on the exterior of said aircraft;
   a smooth, aerodynamically shaped housing having a central cavity and an aperture at one end thereof, said housing being secured to said second mounting means at the other end thereof, said housing being separable along a line generally parallel to a line running between the ends of said housing, the opposite internal walls of said housing include cooperating pairs of slots, the axes of said slots being generally transverse to a line running between the ends of said housing;
   a plurality of tensioning units mounted in said cavity, each of said tensioning units having an elongated member extending through said aperture; and,
   means for selectively connecting the elongated member of said tensioning units to the other end of said antenna.

3. The apparatus of claim 2 wherein said tensioning units comprise an elongated member wound on a drum, said drum being mounted on a shaft having the ends thereof disposed in a cooperating pair of slots in the opposite internal side walls of said housing, the axes of said slots being generally transverse to a line running between the ends of said housing.

4. The apparatus of claim 2 wherein each of said tensioning units includes a drum mounted on a shaft coaxial therewith, and each of said elongated members comprises a flat spring wound about said drum with one end thereof extending through said aperture.

5. The apparatus of claim 2 wherein each of said tensioning units includes a nonrotatable shaft, a drum mounted for rotation about said shaft, a spiral wound spring having one end connected to said shaft and the other end connected to the interior of said drum for biasing said drum to a predetermined angular position relative to said shaft, and wherein each of said elongated members comprises a flexible web wound about said drum with one end of said web extending through said aperture.

6. The apparatus of claim 2 wherein each of said tensioning units comprises a drum mounted on a shaft coaxial therewith, the ends of said shaft being disposed in a cooperating pair of said slots in the opposite internal walls of said housing, and each of said elongated members comprises a flat spring wound about said drum with one end thereof extending through said aperture.

7. The apparatus of claim 2 wherein each of said tensioning units includes a drum mounted for rotation on a nonrotatable shaft, the ends of said shaft being disposed in a cooperating pair of said slots in the opposite internal side walls of said housing, a spiral wound spring having one end connected to said shaft and the other end connected to the interior of said drum for biasing said drum to a predetermined angular position relative to said shaft, and wherein each of said elongated members comprises a flexible web wound round said drum with one end of said web extending through said aperture.

8. Apparatus comprising:
   an aircraft;
   first mounting means connected at a first predetermined location on the exterior of said aircraft;
   an elongated antenna having one end connected to said first mounting means;

second mounting means connected at a second predetermined location on the exterior of said aircraft;

a smooth, aerodynamically shaped housing having a central cavity and an aperture at one end thereof, said housing being secured to said second mounting means at the other end thereof;

a plurality of tensioning units mounted in said cavity, each of said tensioning units having an elongated member wound on a drum and extending through said aperture, said drum being mounted on a shaft having the ends thereof disposed in a cooperating pair of slots in the opposite internal side walls of said housing, the axes of said slots being generally transverse to a line running between the ends of said housing; and, means for selectively connecting the elongated member of said tensioning units to the other end of said antenna.

9. Apparatus comprising:
an aircraft;
first mounting means connected at a first predetermined location on the exterior of said aircraft;
an elongated antenna having one end connected to said first mounting means;
second mounting means connected at a second predetermined location on the exterior of said aircraft;
a smooth, aerodynamically shaped housing having a central cavity and an aperture at one end thereof, said housing being secured to said second mounting means at the other end thereof;
a plurality of tensioning units mounted in said cavity, each of said tensioning units including a drum mounted on a shaft coaxial therewith and a flat spring wound about said drum with one end thereof extending through said aperture; and,
means for selectively connecting the elongated member of said tensioning units to the other end of said antenna.

10. The apparatus of claim 9 wherein said housing is separable along a line generally parallel to a line running between the ends of said housing, and wherein the opposite internal walls of said housing include cooperating pairs of slots, the axes of said slots being generally transverse to a line running between the ends of said housing.

11. The apparatus of claim 9 further including a pair of resilient and electrically conductive arms secured to an internal wall of said housing and biased into wiping contact with said tensioning units.

12. An aircraft antenna tensioning device comprising:
a hollow housing having a smooth external surface, one end of said housing being apertured and the other end being adapted to be secured to an aircraft, the opposite internal side walls of said housing including pairs of cooperating slots, the axes of said slots being generally transverse to a line running between the ends of the housing; and,
first and second tensioning units each having means adapted for insertion into one of said cooperating pairs of slots within said housing and each having an extensible member adapted for extension through said aperture for selective connection to an antenna.

13. The apparatus of claim 12 wherein each of said tensioning units includes a drum mounted on a shaft coaxial therewith, and each of said elongated members comprises a flat spring wound about said drum with one end thereof extending through said aperture.

14. The apparatus of claim 12 wherein each of said tensioning units includes a nonrotatable shaft, a drum mounted for rotation about said shaft, a spiral wound spring having one end connected to said shaft and the other end connected to the interior of said drum for biasing said drum to a predetermined angular position relative to said shaft, and wherein each of said elongated members comprises a flexible web wound round said drum, with one end of said web extending through said aperture.

15. The apparatus of claim 12 further including a pair of resilient and conductive arms secured to an internal wall of said housing and biased into wiping contact with said tensioning units.

16. Apparatus comprising:
an aircraft;
first mounting means connected at a first predetermined location on the exterior of said aircraft;
an elongated antenna having one end connected to said first mounting means;
second mounting means connected at a second predetermined location on the exterior of said aircraft;
a smooth, aerodynamically shaped housing having a central cavity and an aperture at one end thereof, said housing being secured to said second mounting means at the other end thereof and being separable along a line generally parallel to a line running between the ends of said housing, the opposite internal walls of said housing including cooperating pairs of slots, the axes of said slots being generally transverse to a line running between the ends of said housing;
a plurality of tensioning units mounted in said cavity each of said tensioning units having an elongated member; and,
means for selectively connecting the elongated member of said tensioning units to the other end of said antenna.

17. An apparatus according to claim 16 wherein said tensioning units comprise an elongated member wound on a drum, said drum being mounted on a shaft having the ends thereof disposed in a cooperating pair of slots in the opposite internal side walls of said housing, the axes of said slots being generally transverse to a line running between the ends of said housing.

18. Apparatus comprising:
an aircraft;
first mounting means connected at a first predetermined location on the exterior of said aircraft;
an elongated antenna having one end connected to said first mounting means;
second mounting means connected at a second predetermined location on the exterior of said aircraft;
a smooth, aerodynamically shaped housing having a central cavity and an aperture at one end thereof, said housing being secured to said second mounting means at the other end thereof;
a plurality of tensioning units mounted in said cavity, each of said tensioning units including an elongated member wound on a drum, said drum being mounted on a shaft having the ends thereof disposed in a cooperating pair of slots in the opposite internal side walls of said housing, the axes of said slots being generally transverse to a line running between the ends of said housing; and,
means for selectively connecting the elongated member of said tensioning units to the other end of said antenna.

* * * * *